United States Patent Office 2,848,486
Patented Aug. 19, 1958

2,848,486
4,4′-(2,2-BUTYLIDENE) DIBENZOIC ACID

John C. Petropoulos, South Norwalk, Conn., assignor to American Cyanamid Company, New York, N. Y., a corporation of Maine No Drawing. Application July 20, 1955
Serial No. 523,355

1 Claim. (Cl. 260—515)

This invention relates to a novel class of dicarboxylic acids and to the process of preparing the same. Still further, this invention relates to a novel class of alkyd resins prepared by reacting a polyhydric alcohol with one or more of the novel dicarboxylic acids of the present invention and to the process of preparing said alkyd resins. Still further, this invention relates to a novel class of dibenzoic acids prepared by the oxidation of certain ditolyl alkanes in which the tolyl groups are joined together through one or more non-terminal carbon atoms of the alkane. The novel dicarboxylic acids of the present invention may be illustrated by the general formula:

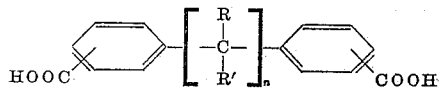

and may be prepared by oxidizing a compound having the general formula:

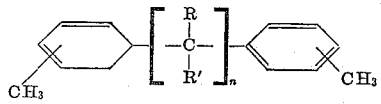

wherein R is an alkyl group containing 1 to 4 carbon atoms and R′ is an alkyl group containing 2 to 4 carbon atoms and n is a whole number between 1 and 2, inclusive.

One of the objects of the present invention is to produce a novel class of dicarboxylic acids. A further object of the present invention is to produce a new and useful class of alkyd resins using the novel dicarboxylic acids of the present invention in coreaction with polyhydric alcohols. These and other objects of the present invention will be discussed in greater detail hereinbelow.

One of the principal end uses for dicarboxylic acids is in the preparation of alkyd resins and unsaturated polyester resins. In the latter instance, use is made of alpha,beta-ethylenically unsaturated dicarboxylic acids such as maleic, fumaric, aconitic, itaconic, and the like. In the preparation of alkyd resins, however, it is generally conventional to make use of a dicarboxylic acid which is free from non-benzenoid unsaturation. The outstanding acid used commercially in the preparation of alkyd resins is phthalic acid or phthalic anhydride. Alkyd resins prepared from phthalic anhydride are usually modified with a fatty acid and have, for the most part, fairly satisfactory properties but in some respects these alkyd resins have certain well established shortcomings.

For example, the chemical resistance and impact resistance of fatty acid modified phthalic alkyd resins is closely related to the amount of fatty acid modifier. An increase in fatty acid content almost always improves the impact resistance of phthalic alkyds at the expense of chemical and heat resistance. Conversely a decrease in fatty acid modifier improves heat and chemical resistance but adversely affects impact resistance. These deficiencies have limited the use of phthalic alkyd resins in many fields, some of the important ones being can coatings and primers for appliances such as washing machines, refrigerators, ranges and the like.

The alkyds of the present invention when compared with phthalic alkyds at comparable hardness are far superior in chemical resistance, toughness as measured by knife scratch, and impact resistance. In addition, at the same degree of ultimate hardness, the alkyds of the present invention cure (air dry or bake) at a considerably faster rate than phthalic alkyds.

In the preparation of the novel dicarboxylic acids of the present invention, certain ditolyl alkanes are oxidized to the corresponding dibenzoic acids. It is imperative, however, that the tolyl groups in the novel carboxylic acids of the present invention be joined together through one or more non-terminal carbon atoms of the alkane. If these linking carbon atoms in the alkane chain are terminal carbon atoms, the markedly superior results realized in the practice of the process of the present invention are not experienced. First of all, the ditolyl alkanes in which the tolyl groups are joined through a terminal carbon atom of the alkane are not readily oxidizable to the corresponding dicarboxylic acid and, in fact, there is often cleavage between the two tolyl groups in which oxidation takes place at the alkane group joining the tolyl groups rather than on the methyl groups on the aryl nuclei. Even though such a ditolyl alkane were to be oxidized successfully to the coresponding dicarboxylic acid, the alkyd resin produced therefrom would show a lack of heat stability, light stability, lack of good color, color stability, gloss and strength. Still further such an alkyd resin would not be stable to mild oxidizing conditions such as air at elevated temperatures in the presence of metallic salt driers. The exact opposite is true of the alkyd resins prepared from the novel dicarboxylic acids of the present invention. These new alkyd resins show improved heat stability, improved light stability, improved color, improved color stability, improved gloss, improved strength, and said alkyd resins are stable to mild oxidizing conditions such as those mentioned above.

The ditolyl alkanes of the present invention may be oxidized under any of the usual oxidizing conditions to form the corresponding dicarboxylic acids. In the oxidation of the ditolyl alkanes, one may utilize temperatures varying from about room temperature to about the boiling point of the ditolyl alkane. It is preferred, however, to utilize temperatures greater than about 100° C. as the temperatures significantly below that temperature will cause the oxidation reaction to proceed slowly. The oxidation reaction may be carried out in the presence of any of the well known oxidizing reagents such as chromic acid in glacial acetic acid; potassium permanganate, in the presence of an alkali; potassium dichromate, or in the presence of a strong acid such as sulfuric acid.

Some of the ditolyl alkanes which are oxidized to the dibenzoic acids of the present invention may be prepared by reacting a compound having the general formula:

wherein R is hydrogen or an alkyl group containing between 1 and 4 carbon atoms, and wherein n is a whole number between 1 and 2, inclusive, with an olefin having between 2 and 4 carbon atoms such as ethylene, propylene and butylene either alpha, beta or isobutylene. Instead of using an olefin containing between 2 and 4 carbon atoms, one could react the compound with an alkyl halide having between 2 and 4 carbon atoms, such as ethyl iodide or the like to yield an ethyl substituent in place of the hydrogen on the alkane. The total number of mols of ethyl iodide or olefin used in the reaction will depend on the total number of available hydrogens on the alkane that are to be replaced.

The following is set forth for the purpose of illustrating the method of the preparation of a ditolyl alkane. This example is set forth primarily for the purpose of illustration and all parts are parts by weight.

PREPARATION OF 2,2-DI(P-TOLYL)BUTANE

Into an autoclave there is introduced 105 parts of 1,1-di(p-tolyl)ethane, 5 parts of sodium and 1.5 parts of o-toluic acid. The system is purged with nitrogen gas and then sealed. The autoclave is then heated to about 170° C. and the pressure is released. There is then charged 11.8 parts of ethylene to 900 p. s. i. and the system is closed. The temperature is then maintained at 170° C. with intermittent addition of ethylene until no further pressure drop is experienced. This requires about 6 hours. The autoclave is then cooled and the reaction products are filtered and washed with hexane. The filtrates are combined, washed and distilled. The product produced is 2,2-di(p-tolyl)butane having a boiling point of 196° C. at 20 millimeters of pressure.

PREPARATION OF 3,3-DI(P-TOLYL)PENTANE

The preceding example is repeated in all essential details except that in the place of 1,1-di(p-tolyl)ethane, there is substituted an equivalent amount of 1,1-di(p-tolyl)propane and in the place of the o-toluic acid, there is substituted an equivalent amount of o-chlorotoluene. The resultant product is a viscous liquid having a boiling point of 213–220° C. at 15 mm. of mercury. The product is 3,3-di(p-tolyl)pentane.

Among the ditolyl alkanes which may be prepared by a comparable process or by the alkyl halide process and which may be used in the practice of the process of the present invention are 1,2-di(p-tolyl)-1,1,2,2-tetramethylethane; 1,2-di(p-tolyl)-1,1,2,2-tetraethylethane; 1,2-di(p-tolyl)-1,1,2,2-tetrapropylethane; 1,2-di(p-tolyl) - 1,1,2,2-tatrabutylethane; 1,2-diethyl-1,2-dimethyl-1,2-di(p-tolyl)ethane; 1,1,2,2-tetraethyl-1,2-di(o-tolyl)ethane; 1,1,2,2-tetrabutyl-1,2 - di(o-tolyl)ethane; 2,2 - di(p-tolyl)butane; 2,2-di(o-tolyl)butane; 2,2-di(m-tolyl)butane; 2,2-di(p-tolyl)pentane; 2,2-di(o-tolyl)pentane; 2,2-di(m-tolyl)pentane; 3,3-di(p-tolyl)pentane; 3,3-di(o-tolyl)pentane; 3,3-di(m-tolyl)pentane; 2,2-di(p-tolyl)hexane; 3,3-di(o-tolyl)hexane; 3,3-di(p-tolyl)heptane; 3,3-di(o-tolyl)heptane; 4,4-di(p-tolyl)heptane; 4,4-di(p-tolyl)octane; 5,5-di(p-tolyl)nonane; 5,5-di(o-tolyl)nonane; 5,5-di(m-tolyl)nonane, and the like.

Example 1

Into a suitable reaction vessed equipped with thermometer, stirrer and reflux condenser, there is introduced 10 parts of 2,2-di(p-tolyl)butane, 300 parts of acetic acid, 300 parts of water, 90 parts of concentrated sulfuric acid and 70 parts of chromic acid. The mixture is heated to reflux temperature and maintained at that temperature for about 10 hours. On diluting the reaction mixture with water, 7 parts of a solid material precipitated. After purification by recrystallization from alcohol, this solid material melted at 267° C. uncorrected, and had a neutral equivalent of 150 (theoretical=149). The product produced is identified as 4,4'-(2,2-butylidene)dibenzoic acid.

Example 2

Into an autoclave equipped as in Example 1, there is introduced 23.8 parts of 2,2-di-p-tolyl butane, 30.6 parts of concentrated nitric acid, and 61.0 parts of water. The reactants are heated to 160° C., whereupon the reaction becomes exothermic and the temperature increases to about 190° C. The reactants are held at 170–190° C. for 30 minutes. Thereafter, the charge is cooled to room temperature and the reactants are discharged. The product produced, a light tan solid, is obtained in an 84% yield and melts at about 220–225° C. After several recrystallization from acetic acid to remove the color impurities, the melting point is raised to 267–8° C. uncorrected. The analysis: Calculated for $C_{18}H_{18}O_4$: C, 72.47; H, 6.08; neutral equivalent 149. Found: C, 72.23; H, 6.14; neutral equivalent 150.

Example 3

Into an autoclave equipped as in Example 1, there is introduced 25.2 parts of 3,3-di-p-tolyl-pentane, 30.6 parts of concentrated nitric acid and 61 parts of water. The reactants are heated to 160° C., whereupon the reaction becomes exothermic and the temperature rises to about 185–190° C. The reactants are held at 175–190° C. for about 30 minutes, whereupon the charge is cooled to room temperature and the reactants discharged. The yield is approximately 87% of theoretical and the product produced is a light tan solid which melts at about 255–285° C. After several recrystallizations from acetic acid, the melting point is determined at 305–6° C., uncorrected. The product produced is 4,4'-(3,3-pentylidene)dibenzoic acid. Analysis calculated for $C_{19}H_{20}O_4$: C. 73.06; H, 6.45; neutral equivalent 156. Found: C, 73.11; H, 6.65, neutral equivalent 153.

Example 4

To 1.0 part of 4,4'-(3,3-pentylidene)dibenzoic acid, dissolved in 50 parts of methanol, there is added 8 parts of anhydrous hydrogen chloride. The clear solution was concentrated by evaporation to 20 parts by weight. On cooling, 0.95 part (87% yield) of a colorless solid crystallized in clusters of needles. The solid had a melting point of 85° C., uncorrected. The product was dimethyl-4,4'-(3,3-pentylidene)dibenzoate.

Example 5

Into a suitable reaction vessel equipped as in Example 1, there is introduced 20 parts of 1,1,2,2-tetramethyl-1-2-di(p-tolyl)ethane, 600 parts of acetic acid, 600 parts of water, 140 parts of chromic acid and 180 parts of sulfuric acid. The charged mixture is heated at the reflux temperature for about 22 hours. Dilution of the system with water caused 20 parts of a solid material to precipitate which had a neutral equivalent of 113. The crude solid which precipitated was treated with alkali yielding two fractions; the first fraction (A) was soluble in cold alkali, whereas the second fraction (B) was soluble in hot alkali. The latter fraction (B), on acidification, gave a solid acid which, after purification by crystallization from acetic acid, melted at 218–19° C. uncorrected. The analysis and infrared spectrum on this material are compatible with the monobasic acid having the following formula: 1,1,2,2-tetramethyl-1-(p-tolyl)-2-(p-carboxyphenyl)-ethane. Analysis calculated for $C_{20}H_{24}O_2$: C, 81.04; H, 8.16; —COOH, 15.19. Found: C, 81.30; H, 8.23; —COOH, 14.88. The acidification of fraction (A) gave a white solid of a melting point of greater than 300° C. This material was found to be insoluble in most of the common solvents. In order to facilitate purification, this material was converted into the more soluble di-methylester derivative by treatment with excess methanol and dry hydrogen chloride. Concentration of the methanol solution gave colorless prisms, which after crystallization from methanol melted at 218° C. uncorrected. The analysis and infrared spectrum of this material are compatible with the compound dimethyl 4,4'-(1,1,2,2-tetramethylethylene)dibenzoate. Calculated for $C_{22}H_{26}O_4$: C, 74.55; H, 7.40; saponification number 177. Found: C, 74.47; H, 7.59; saponification number 172. The hydrolysis of the dimethyl ester is accomplished by refluxing the same in methanolic potassium hydroxide followed by acidification with hydrochloric acid to give a solid having a melting point greater than 300° C. Analysis and infrared spectroscopy demonstrated this material to be the diacid derivative of the above-identified dimethyl ester and was found to be 4,4'-(1,1,2,2,-tetramethylethylene)dibenzoic acid.

*Example 6*

Example 1 is repeated in substantially all details except that the ditolyl alkane used as a starting material is 1,1,2,2-tetraethyl-1,2-di(p-tolyl)ethane and the dicarboxylic acid produced is 4,4'-(1,1,2,2,-tetraethylethylene)dibenzoic acid.

*Example 7*

Example 1 is repeated in substantially all essential details except that the ditolyl alkane which is oxidized is 1,2-diethyl-1,2-dimethyl-1,2-di(p-tolyl)ethane. The acid produced is 4,4'-(1,2-diethyl-1,2-dimethylethylene)dibenzoic acid.

Among the dicarboxylic acids which may be prepared in accordance with the concepts of the present invention are: 4,4'-(2,2-butylidene)dibenzoic acid; 4,4'-(1,1,2,2-tetramethylethylene)dibenzoic acid; 4,4'-(1,1,2,2-tetraethylethylene)dibenzoic acid; 4,4'-(1,1,2,2-tetrapropylethylene)dibenzoic acid; 4,4'-(1,1,2,2-tetrabutylethylene)dibenzoic acid; 4,4'-(1,2-diethyl-1,2-dimethylethylene)dibenzoic acid; 2,2'-(1,1,2,2-tetraethylethylene)dibenzoic acid; 2,2'-(1,1,2,2-tetrabutylethylene)dibenzoic acid; 4,4'-(2,2-butylidene)dibenzoic acid; 3,3'-(2,2-butylidene)dibenzoic acid; 2,2'-(2,2-butylidene)dibenzoic acid; 4,4'-(2,2-pentylidene)dibenzoic acid; 3,3'-(2,2-pentylidene)dibenzoic acid; 2,2'-(2,2-pentylidene)dibenzoic acid; 4,4'-(3,3-pentylidene)dibenzoic acid; 3,3'-(3,3-pentylidene)dibenzoic acid; 2,2'-(3,3-pentylidene)dibenzoic acid; 4,4'-(2,2-hexylidene)dibenzoic acid; 3,3'-(2,2-hexylidene)dibenzoic acid; 2,2'-(2,2-hexylidene)dibenzoic acid; 4,4'-(3,3-hexylidene)dibenzoic acid; 4,4'-(3,3-heptylidene)dibenzoic acid; 3,3'-(3,3-heptylidene)dibenzoic acid; 4,4'-(4,4-heptylidene)dibenzoic acid; 4,4'-(4,4-octylidene)dibenzoic acid; 3,3'-(4,4-octylidene)dibenzoic acid; 2,2'-(4,4-octylidene)dibenzoic acid; 4,4'-(5,5-nonylidene)dibenzoic acid; 3,3'-(5,5-nonylidene)dibenzoic acid; 2,2'-(5,5-nonylidene)dibenzoic acid.

The following examples are illustrative of methods for the preparation of alkyd resins using the novel dicarboxylic acids of the present invention. Unless otherwise indicated, all parts are parts by weight. These examples, as in the preceding instances, are set forth primarily for the purpose of illustration and any specific enumeration of detail contained therein should not be interpreted as a limitation on the case except as is indicated in the appended claims.

*Example 8*

Into a suitable reaction vessel, equipped with thermometer, stirrer and inlet and outlet tubes for the passage of inert gases therethrough, there is introduced 298 parts of 4,4'-(2,2-butylidene)dibenzoic acid, 240 parts of soya fatty acids and 118 parts of glycerin. The charge is heated to about 245° C. and held at that temperature until esterification is substantially complete. This resin has an acid number of 10.9 and a Gardner-Holdt viscosity of Z-2 at 50% solids in xylol at 25° C. and a color of 5 (Gardner–1933).

*Example 9*

Into a suitable reaction vessel equipped as in Example 8, there is introduced 284 parts of 4,4'-isopropylidenedibenzoic acid, 240 parts of linseed oil fatty acids, 100 parts of glycerin and 18 parts of ethylene glycol. The reaction chamber is flushed with nitrogen gas so as to provide an inert gas blanket over the reacting materials during the reaction. The charge is then heated to about 240–250° C. and held at about that temperature until esterification is substantially complete as indicated by an acid number of 15.

*Example 10*

Into a suitable reaction vessel equipped as in Example 8, there is introduced 312 parts of 4,4'-(3,3-pentylidene)-dibenzoic acid, 360 parts of the fatty acid fraction of talloil, 119 parts of pentaerythritol, and 95 parts of propylene glycol. The reaction vessel is flushed with nitrogen as in Example 10 and the charge is then heated to about 250° C. and held at that temperature until esterification is substantially complete as is shown by an acid number of 8.

*Example 11*

Into a suitable reaction vessel equipped as in Example 8, there is introduced 708 parts of dimethyl 4,4'-(1,1,2,2-tetramethylethylene) dibenzoate, 294 parts of the methyl esters of dehydrated castor oil fatty acids, 187 parts of pentaerythritol and 4.5 parts of lead octoate. The charge is heated under a blanket of nitrogen gas to 190–200° C. whereupon methanol is continuously removed. The reaction is stopped short of gelation. The resin is diluted with Cellosolve acetate to a solids content of about 50%.

*Example 12*

Into a suitable reaction vessel equipped as in Example 8, there is introduced 36 parts of 4,4'-(2,2-butylidene)dibenzoic acid dissolved in 450 parts of methanol. The solution is saturated with anhydrous hydrogen chloride and the reactants are allowed to act overnight, whereupon 30 parts of dimethyl 4,4'-(2,2-butylidene)dibenzoate crystallized out. The product produced had a melting point of 89–90° C. uncorrected, and gave the following analysis: Calculated for $C_{20}H_{22}O_4$: C, 73.60; H, 6.80. Found: C, 73.73; H, 6.88.

In the preparation of the alkyd resins of the present invention, one may react any of the novel dicarboxylic acids of the present invention with any of the conventional polyhydric alcohols used in the preparation of alkyd resins. Illustrative of these polyhydric alcohols are ethylene glycol, diethylene glycol, trimethylene glycol, tetramethylene glycol, glycerol, trimethylolpropane, trimethylolethane, sorbitol, pentaerythritol, dipentaerythritol, pinacol, arabitol, xylitol, adonitol, mannitol, or the alkane diols and the like. Quite obviously, these polyhydric alcohols may be used either singly or in combination with one another.

In the preparation of alkyd resins, it is often desirable to make use of a glyceride oil in order to impart flexibility to the alkyd resins produced. Any of the glyceride oils or fatty acids derived therefrom may be used. These oils may be either non-drying, semi-drying or drying oils. In the preparation of such an oil-modified alkyd resin, the novel dicarboxylic acids of the present invention may be reacted with a polyhydric alcohol alcoholysis product of these saturated and/or unsaturated glyceride oils. Illustrative of these oils are coconut oil, palm oil, safflower oil, rape seed oil, peanut oil, corn oil, cottonseed oil, soya oil, linseed oil, perilla oil, castor oil, either raw or dehydrated, talloil, oiticica oil, sardine oil, tung oil, whale oil and the like. Additionally, one may make use of certain fatty acids such as lauric acid, stearic acid, palmitic acid and the like. Quite obviously, these oils or fatty acids may be used either alone or in combination with one another.

The alkyd resins of the present invention may be further modified by copolymerizing the oil-modified alkyd resins with compounds containing a polymerizable $CH_2=C<$ group, such as styrene, alpha-methyl styrene, alpha-ethyl styrene, alpha-chloro-styrene, and the ring substituted styrenes such as the ortho, meta, and para-alkyl styrenes such as the ortho-methyl styrene, meta-methyl styrene, p-methyl styrene, meta-ethyl styrene, p-propyl styrene and the like; or the disubstituted styrenes such as 2,4-dimethylstyrene, 2,5-diethyl styrene, and 3,4-dipropyl styrene and the like; or the ring substituted mono and dihalo styrenes such as ortho, meta or para-chloro styrenes or 2,4-dichlorostyrene or 2,5-dibromostyrene and the like. Additionally, one could make use of such polymerizable monomers as the alkyl acrylates and methacrylates such as methylmethacrylate, methylacrylate, and the like; or the nitriles such as acrylonitrile, methacrylonitrile, ethacrylonitrile, and the like. These polymerizable monomers may be used either singly or in combination with one another. When the alkyd resins of the present invention are to be modified by reaction with a compound containing a polymerizable $CH_2=C<$ group, it is generally desired that the alkyd resin be first modified with an oil or the fatty acids derived therefrom or the oil may be interpolymerized with the monomer and then reacted with a polyhydric alcohol and a novel dicarboxylic acid of the present invention. These oils or fatty acids are preferably those which contain some measure of unsaturation in order to permit interpolymerization between the unsaturated group in the vinyl or vinylidene group with the unsaturated double bond in the fatty acid chain. This lends to greater compatibility between the homo-polymer which may be present and the vinyl or vinylidene monomer modified oil alkyd resin.

In addition to the use of the novel dicarboxylic acids of the present invention in the manufacture of alkyd resins, one may make use of other carboxylic acids such as those which are free of non-benzenoid unsaturation, e. g. phthalic, oxalic, malonic, succinic, glutaric, sebacic, adipic, pimelic, suberic, azelaic, tricarballylic, citric, tartaric, malic and the like. Additionally, if it is desired to make use of unsaturated polycarboxylic acids such as the alpha-beta-ethylenically unsaturated acids, one may use such acids as maleic, fumaric, aconitic, itaconic, and the like. Obviously, these acids may be utilized in combination with one another conjunctively with the novel dicarboxylic acids of the present invention in the preparation of alkyd resins. Still further, the anhydrides of these acids, whenever available, or mixtures of these anhydrides may be utilized with the novel dicarboxylic acids of the present invention. Mixtures of the anhydrides with mixtures of the acids may be utilized as well.

A further utilization of the dicarboxylic acids of the present invention will be in the preparation of alkyl esters which may be utilized in the manufacture of alkyd resins by the process known as ester-interchange. These alkyl esters of the novel dicarboxylic acids of the present invention will further find utilization as plasticizers for resinous materials such as polyvinyl chloride and polyvinylidene chloride and the like. These alkyl esters may contain anywhere from 1 to 12 carbon atoms in the alkyl portion of the ester. For plasticization purposes, the dibutyl esters, the dihexyl esters and the dioctyl esters and those between are generally the most useful.

The novel alkyd resins of the present invention, whether oil-modified or not, may be combined by physical admixture with aminoplast resins to form coating compositions. These aminoplast resins may be such resins as are formed by the reaction of an aldehyde such as formaldehyde with a compound containing a plurality of amino groups to which are attached aldehyde reactable hydrogen atoms. Illustrative of this class of amino compounds are the aminotriazines such as melamine, benzoguanamine, formoguanamine, acetoguanamine, and the like. Additionally, the ureas may be used, such as urea per se, thiourea, ethyleneureas and the like. It is generally preferred that the aminoplast resins be alcohol modified, and more particularly, modified with butanol. The following examples will illustrate the properties of the alkyd resins of the present invention.

Example 13

A clear unpigmented solution of the alkyd resin of Example 8 is used to draw down films on steel panels and the film is baked for 30 minutes at 300° F. A clear unpigmented solution of a 36% soya fatty acid modified phthalic alkyd is used to draw down films as above.

These solutions contained .015% by weight of cobalt as cobalt naphthenate. The comparative results are shown in Table 1.

TABLE 1

|  | Phthalic Alkyd Resin | Alkyd Resin of Example 8 |
|---|---|---|
| Knife scratch | Fair | Excellent. |
| Solvent Resistance, Xylol | Poor | Good. |
| 5% NaOH | do | Excellent. |
| 50% Acetic Acid | do | Do. |
| Impact Resistance (inch lbs.) | <2 | 28. |

Comparable films are drawn down on separate glass panels from the alkyd resin prepared according to Example 8 and from a comparable alkyd prepared from phthalic anhydride. Each of these alkyd resins contained 0.015% by weight of cobalt as cobalt naphthenate. The films were allowed to air-dry on these glass panels. The results are shown in the following table.

TABLE 2

|  | Alkyd Resin of Example 8 | Phthalic Alkyd Resin |
|---|---|---|
| Drying Rate 3 hrs | Tack free | Tacky. |
| Drying Rate 24 hrs | Dry | Green. |
| Hardness (24 hrs.) | Excellent | Poor. |
| Through dry (24 hrs.) | do | Fair. |

Two coating compositions are prepared using an alkyd resin in admixture with an aminoplast resin in a ratio of 75 parts of alkyd resin to 25 parts of a butylated melamine-formaldehyde resin. The pigment-to-resin ratio is 0.9:1. The alkyd resins are substantially identical in each instance except in regard to the dicarboxylic acid used. The alkyd resin of Example 8 and a phthalic anhydride alkyd resin are used. After the films from these coating compositions are drawn down on steel panels, they are baked for 30 minutes at 300° F. The results of the tests to which these films were subjected are shown in Table 3.

TABLE 3

|  | B–M–F+Alkyd Resin of Example 8 | B–M–F+ Phthalic Alkyd Resin |
|---|---|---|
| Knife Scratch | Excellent | Fair. |
| Solvent Resistant, Xylol | Good | Do. |
| 5% NaOH | Excellent | Poor. |
| 50% Acetic Acid | do | Do. |

The preceding set of two enamels are repeated in every detail except that the pigment to resin ratio is 0.56:1. The results are shown in Table 4.

TABLE 4

|  | B–M–F+Alkyd Resin of Example 8 | B–M–F+ Phthalic Alkyd Resin |
|---|---|---|
| Knife scratch | Excellent | Fair. |
| Solvent Resistance, Xylol | do | Good. |
| 5% NaOH | do | Fair. |
| 50% Acetic Acid | do | Do. |

Example 14

Into a suitable reaction vessel equipped as in Example 8, there is introduced 312 parts of 4,4'-(3,3-pentylidene)-dibenzoic acid, 255 parts of refined soya fatty acids and 115 parts of 98% glycerine. The ingredients are heated up to and held at about 260° C. under an inert nitrogen atmosphere with agitation until the esterification is substantially complete. The alkyd product had an acid number of 7.8; a viscosity of X at 50% solids in xylol on the Gardner-Holdt scale at 25° C. and a color of 5 (Gardner-1933).

Films drawn down therefrom were compared with a commercially available phthalic alkyd resin as in Table 1. The results are shown in Table 5.

TABLE 5

|  | B-M-F+Alkyd Resin of Example 14 | B-M-F+ Phthalic Alkyd Resin |
|---|---|---|
| Knife Scratch | Excellent | Fair. |
| Solvent Resistance, Xylol | Good | Poor. |
| 5% NaOH | Excellent | Do. |
| 50% Acetic Acid | do | Do. |

In addition to using the novel dicarboxylic acids of the present invention for the preparation of alkyd resins for surface coatings, these dicarboxylic acids may be used for the preparation of linear polyester resins by reacting with difunctional glycols such as ethylene glycol, diethylene glycol, propylene glycol and the like. Additionally, these linear polyester or alkyd resins prepared by using the novel dicarboxylic acids of the present invention may be used in the coating of paper and in the treatment of textile materials such as natural or synthetic fibrous materials or the fabrics produced therefrom. Still further, these polyesters and alkyds may be utilized in the treatment of leather. They may further be used as adhesive materials or in molding compositions or in the preparation of synthetic fibers.

The novel dicarboxylic acids of the present invention may be further modified in order to produce substituted dicarboxylic acids for particular purposes. For instance, if halogenated acids are desired such as those which are utilized in the preparation of fire-resistant alkyd resins, the fundamental dicarboxylic acids of the present invention may be nuclearly halogenated with chlorine, bromine, iodine and/or fluorine. It is possible to oxidize the halo-substituted ditolyl alkanes, described in detail hereinabove, to produce the novel dicarboxylic acids of the present invention but because of the risk of side reactions and other complications, it is preferred to oxidize the ditolyl alkanes to the dicarboxylic acids first and then to halogenate whenever a nuclear substituted halo dicarboxylic acid is desired.

I claim:

4,4'-(2,2-butylidene) dibenzoic acid.

References Cited in the file of this patent

UNITED STATES PATENTS

| 2,245,528 | Loder | June 10, 1941 |
| 2,410,073 | Howard | Oct. 29, 1946 |
| 2,416,350 | Rollman | Feb. 25, 1947 |
| 2,435,429 | Evans et al. | Feb. 3, 1948 |
| 2,578,654 | Hearne et al. | Dec. 18, 1951 |
| 2,610,191 | Toland | Sept. 9, 1952 |
| 2,647,141 | Cavanaugh et al. | July 28, 1953 |
| 2,712,543 | Gresham et al. | July 5, 1955 |
| 2,794,822 | Schweitzer | June 4, 1957 |

FOREIGN PATENTS

| 510,659 | Canada | Mar. 8, 1955 |

OTHER REFERENCES

Wakeman: "Chemistry of Commercial Plastics," p. 261, Reinhold Pub. Corp., New York, 1947.